US008327405B2

(12) United States Patent
Cilli et al.

(10) Patent No.: US 8,327,405 B2
(45) Date of Patent: Dec. 4, 2012

(54) SYSTEM AND METHOD OF WIRELESS UPLINK VIDEO TRANSMISSION WITH POLICY-COMPLIANT DISTRIBUTION TO VIEWERS

(75) Inventors: Bruce R. Cilli, Atlantic Highlands, NJ (US); Charles Payette, Oceanport, NJ (US)

(73) Assignee: Alcatel Lucent, Paris (FR)

( * ) Notice: Subject to any disclaimer, the term of this patent is extended or adjusted under 35 U.S.C. 154(b) by 331 days.

(21) Appl. No.: 12/702,722

(22) Filed: Feb. 9, 2010

(65) Prior Publication Data

US 2011/0131613 A1 Jun. 2, 2011

Related U.S. Application Data

(60) Provisional application No. 61/265,043, filed on Nov. 30, 2009.

(51) Int. Cl.
| | |
|---|---|
| *H04N 7/16* | (2011.01) |
| *G06F 15/16* | (2006.01) |
| *G06F 15/173* | (2006.01) |
| *G06Q 99/00* | (2006.01) |
| *H04W 4/00* | (2009.01) |

(52) U.S. Cl. .......... 725/62; 709/206; 709/225; 709/229; 709/232; 709/233; 705/319; 455/466

(58) Field of Classification Search ................ 725/62; 709/206, 225, 229, 232, 233; 705/319, 14.44; 455/466

See application file for complete search history.

(56) References Cited

U.S. PATENT DOCUMENTS

| | | | |
|---|---|---|---|
| 2008/0092178 A1* | 4/2008 | McNamara et al. | 725/62 |
| 2008/0134235 A1 | 6/2008 | Kalaboukis | |
| 2009/0015660 A1* | 1/2009 | Vedantham et al. | 348/14.09 |
| 2009/0181705 A1* | 7/2009 | Yin | 455/466 |
| 2010/0268783 A1* | 10/2010 | Mizosoe et al. | 709/206 |
| 2012/0016748 A1* | 1/2012 | Aaltonen et al. | 705/14.64 |

FOREIGN PATENT DOCUMENTS

| | | |
|---|---|---|
| DE | 102007031538 A1 | 1/2009 |
| WO | 2009007815 A2 | 1/2009 |
| WO | PCT/US2010/055776 | 1/2011 |

OTHER PUBLICATIONS

S. Wenger, Y.K. Wang, T. Schierl, A. Eleftheriadis—RTP Payload Format for SVC Video—Apr. 26, 2010—105 pages.
T. Schierl, Fraunhofer HHI, S. Wenger—Signaling Media Decoding Dependency in the Session Description Protocol—Jul. 2009—19 pages.

* cited by examiner

*Primary Examiner* — Hoang-Vu A Nguyen-Ba
(74) *Attorney, Agent, or Firm* — M. I. Finston

(57) ABSTRACT

A method for operating a personal communication device includes, using a user interface, selecting a policy type and entering parameters of the selected policy type, thereby to designate a policy to govern the distribution of a video signal to viewers by a wireless network. One or more messages are transmitted from the personal communication device, in which the policy is communicated to a video server within the wireless network. A prompt is received from the video server to begin transmitting the video signal, and then the personal communication device begins wirelessly transmitting the video signal on an uplink to the wireless network for distribution according to the policy.

11 Claims, 3 Drawing Sheets

SYSTEM AND METHOD OF WIRELESS UPLINK VIDEO TRANSMISSION WITH POLICY-COMPLIANT DISTRIBUTION TO VIEWERS

RELATED APPLICATIONS

This application claims priority pursuant to 35 U.S.C. Sec 119(e) to U.S. Provisional Application No. 61/265,043, filed Nov. 30, 2009, entitled "SYSTEM AND METHOD OF WIRELESS UPLINK VIDEO TRANSMISSION," the subject matter thereof being fully incorporated herein by reference.

FIELD OF THE INVENTION

The invention relates to broadband-communication in wireless networks, and particularly to video distribution in such networks.

ART BACKGROUND

Wireless access links, such as those provided by 3G and 4G networks, are shared, limited resources and as such may become scarce as demand outstrips supply. As a consequence, contention will arise when too many users attempt to transmit data from their mobile devices within the same-sector. Until recently, users predominantly uploaded considerably less data than they would download. However, the recent introduction of video-enabled mobile devices is likely to stimulate rapidly growing demand for uplink bandwidth. It can be expected that one consequence of this growing demand will be frequent saturation of the uplink resource.

There are known methods that facilitate the streaming of video over a wireless link from a mobile device. However, the conventional approaches apply limited intelligence to problems such as the failure of the video to arrive as expected. In the case of such a failure, for example, conventional approaches will typically require the sender of the video to use a trial and error method to successfully deliver the video.

In view of the inherent dynamics of wireless connections, it may be necessary for the user to make repeated manual adjustments to the settings on the mobile device until the video is delivered. This problem will be exacerbated by increasing demand, and may eventually become intractable.

Another deficiency of conventional approaches is that, in general, they do not identify who, e.g. what individual or composite group, is a potential viewer of the video. The user who is transmitting the video, however, will often wish to know who might be viewing the video, particularly if a cost is incurred for streaming the video.

SUMMARY OF THE INVENTION

We have developed a new approach for facilitating the streaming of video over a wireless link from a mobile device. In one aspect, our approach involves operating a personal communication device for the purpose of transmitting video on an uplink. In other aspects, our new approach involves methods, apparatus, and systems for supporting the uplink transmission and distribution of video.

Thus, for example, a user of a personal communication device uses a user interface for selecting a policy type and entering parameters of the selected policy type, thereby to designate a policy to govern the distribution of a video signal to viewers by a wireless network. The device transmits one or more messages in which the policy is communicated to a network element within the wireless network hereinafter referred to as the video server; and receives a prompt from the video server to begin transmitting the video signal. After receiving the prompt, the device wirelessly transmits the video signal on an uplink to the wireless network for distribution according to the policy.

DETAILED DESCRIPTION

Figure 1:
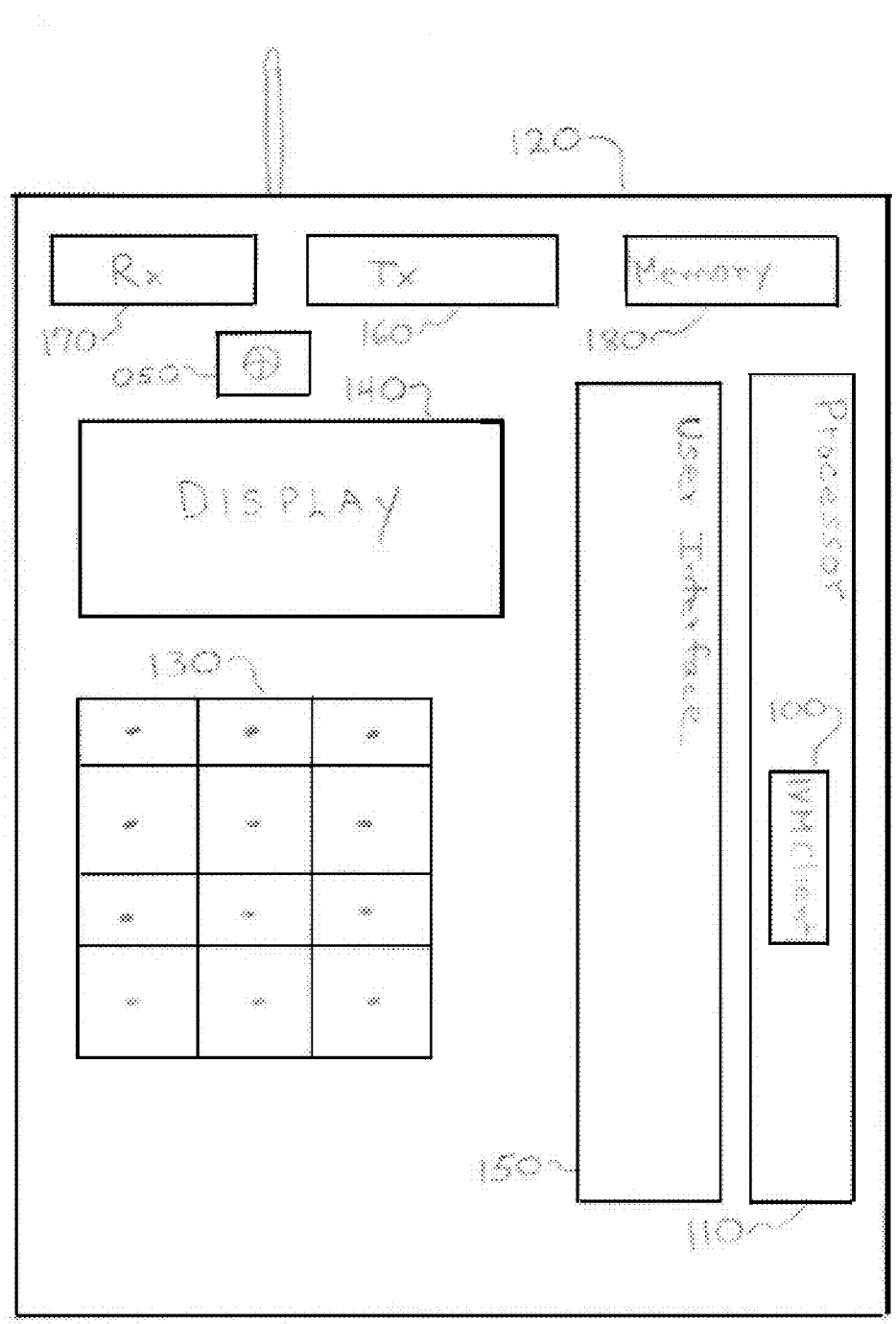
FIG. 1 is a conceptual drawing of a personal communication device useful in practicing the methods described here.

Intelligence is desirably gathered from the network and provided to the mobile device so that it can automatically decide, for the Mobile Content Generator (MCG)—i.e., the user—the best quality of video that can be streamed and ultimately viewed over the wireless link.

The gatherable intelligence may be any information useful in the processing to make the abovesaid decision. Examples include:

Device capabilities of the viewers, such as screen size, that limit the quality of video (such as QVGA as opposed to SVGA) that can be viewed; and network conditions such as the bandwidth that can be maintained to stream the video over the uplink, the bandwidth that the target viewers can maintain for viewing the video, and the bandwidth that can be maintained through the backhaul and core network, as well as the network congestion level.

The gatherable intelligence may also include adjustments based on whether the MCG is stationary or moving.

The gatherable intelligence may also include location information for members of a contact list or followers list. Such information may be used in conjunction with the aforesaid list to define a geofence, for example. By "geofence" is meant a geographic boundary that is logically defined using a location-based service, so that when a suitably responsive device enters or leaves the area, it generates a notification. Thus, for example, a geofence may be defined as containing all points within five miles of the MCG's location, and may be used to enforce a policy that video may be sent only to friends that are within the five-mile range.

Further information may be used to enforce policies that may, for example, further limit the set of approved recipients for a video transmission. For example, user profiles or lists of user interests may be included. On the basis of such a set of profiles or interests, or example, the distribution of a video may be limited to friends who satisfy the criterion that they be located within a five-mile radius as well as a criterion that they be interested in the subject of the video.

Further information may be used to enforce a scheduling policy. For example, the MCG may request that the video be sent immediately, i.e. in real time, or alternatively, the MCG may request that the video be sent by a certain deadline, such as within one hour of the request.

The abovesaid intelligence is gathered and maintained by an application server in the network, referred to here as the Intelligent Video Masher (IVM). An IVM client resides on the MCG device. The MCG device is typically, although not necessarily, a mobile device. It may be any communication device that can process and stream video and can connect to a wireless network, for example a smartphone, laptop, netbook, or camera.

In an example scenario, an Individual A is attending a music festival where events are taking place at multiple venues within a municipal region. Individual A has a personal communication device equipped with a video camera 050 as illustrated e.g., in FIG. 1. Individual A wishes to transmit a video of a scene at some outdoor venue to a group of friends who are all attending the same festival. Individual A wishes to transmit the video as soon as possible, in order to invite all of the friends to join him.

Figure 2:
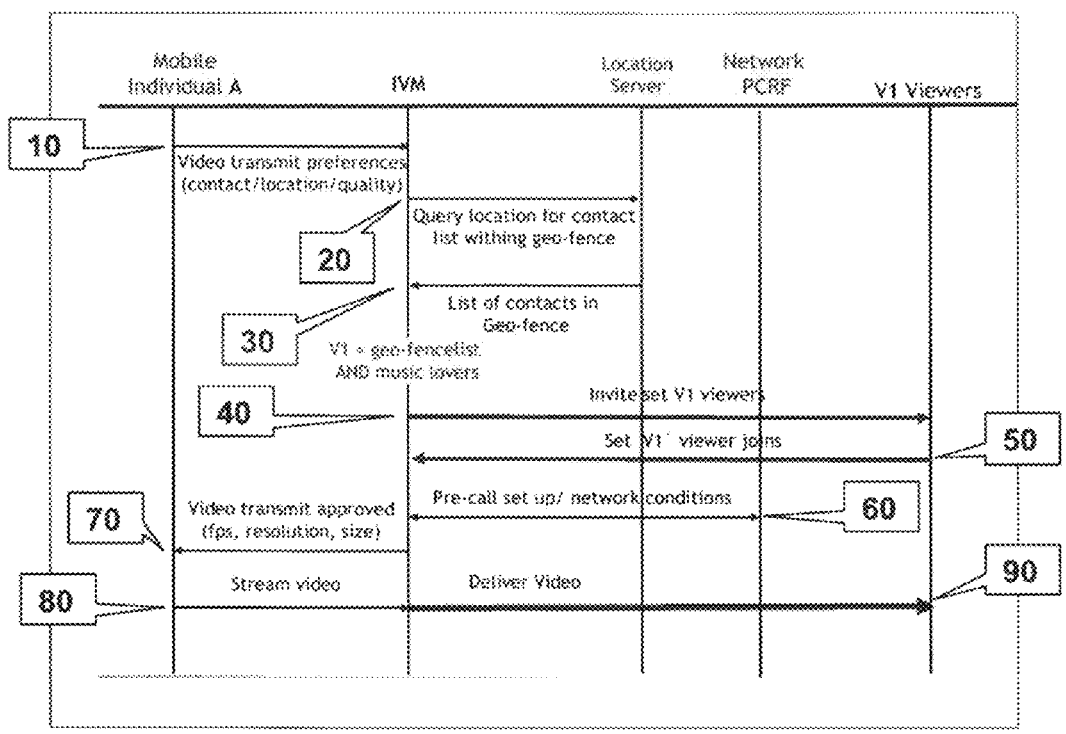
FIG. 2 is a protocol sequence diagram showing how the uplink transmission of video from a personal communication device might be facilitated using the methods described here.

FIG. 2 illustrates a sequence of messages to effectuate the transmission of the desired video from Individual A's smartphone or other communication device, some features of which are illustrated conceptually in FIG. 1. The respective data-storage and data processing elements represented in FIG. 1 may be realized in various ways, for example as separate hardware processors, or as different logically defined functions executed on the same processor. All such implementations, whether carried out in hardware or software, and whether carried out on special purpose processors or on appropriately programmed general-purpose processors, may be useful in this regard and as such, should be regarded as equivalent means for carrying out the operations to be described here. The following discussion will refer to FIGS. 1 and 2, which should be examined in combination.

Turning to FIG. 1, initially, Individual A starts up the IVM client 100 running on, e.g. processor 110 within his smartphone 120. Using keypad 130 and display 140, Individual A enters his preferences through user interface 150. Preferences that might be entered in the scenario described could be, e.g., "Select all people in my contact list who are located within a two-mile radius of my location and are interested in music, and send the best possible quality."

Turning to FIG. 2, terminal 120 transmits Individual A's preferences on message 10 to the IVM, using transmitter 160. The IVM receives Individual A's request and first determines which contacts are within the specified geofence. (To support the geofence, the IVM or a separate appliance may maintain a running list of contacts located within a default geofence.) This is done, e.g., through messages 20 and 30. In message 20, the IVM contacts a location server and requests the identities of all members of the contact list who are located within the geofence, e.g., within a two-mile radius. In message 30, the location server replies with the requested contact identities. The IVM then identifies the music lovers from the set of contacts within the geofence and groups them in a new set V1.

Next, the IVM in message 40 notifies the individuals who are members of V1 with an invitation to view the video. The interested members of V1 can join by, for example, choosing a link to a URL, as displayed on their personal communication devices. (Other methods are also possible and will be apparent to those skilled in the art).

Each member of V1 may join the group receiving the video by transmitting message 50 from that member's personal communication device to the IVM. Message 50 includes a description of the transmitting device's device, capabilities. Turning again to FIG. 2 and taking it as now representing the communication device of a member of V1, the invitation may for example be received via receiver 170 and displayed on display 140. The device capabilities may be retrieved from memory 180 and transmitted with message 50 via transmitter 160.

The IVM creates a composite device capability profile from the set of information received from the personal communication devices.

Turning back to FIG. 2, the IVM in message exchange 60 queries the wireless network to determine what bandwidth Individual A can acquire, in view of Individual A's Service Level Agreement (SLA) and the current network congestion level, as well as other current network conditions. The IVM obtains the requested information from, e.g., a Policy and Charging. Rules Function (PCRF) within the core, network. The PCRF is discussed in more detail below.

The IVM then sends message 70 to Individual A's communication device (which may, e.g., be a smartphone) suggesting the quality of video that could be sent immediately. The available quality may be described, for example, in terms of parameters representing resolution, frames per second, screen size, and the like.

If the suggested parameters meet or exceed user preferences, the IVM prompts Individual A in message 70 to start video transmission. The prompt may, e.g., be processed in user interface 150 and displayed on display 140. In some cases the IVM may have already made a request and reservation for an end-to-end connection or for service flows. In such cases, the video transmission may begin immediately.

In other cases, the user's selecting the prompt message will initiate a call set up, and the video transmission will begin after the call has been established. Video is streamed first, in transmission 80, to the IVM so it may cache the video stream for viewers who join after the live video has ended. In transmission 90, the video is transmitted from the IVM to the viewers identified in set V1 by whatever method is supported by the access system for video content delivery. Two possible methods are unicast and multicast.

In an alternative scenario, Individual A may decide (or set a preference) to suppress the streaming of the video if the number of interested viewers fails to meet some threshold (e.g., ten interested viewers). Or, for example, Individual A may set a preference to send the video in background within a particular time frame.

If network conditions or the state of motion of a mobile terminal prevent the MCG from securing sufficient bandwidth to support a desired quality level, the MCG has various alternatives. For example, the MCG may elect to transmit the video at a lower quality, to delay the transmission by sending (possibly at the higher, quality) in the background within a particular time frame, or to cancel the transmission.

Figure 3:
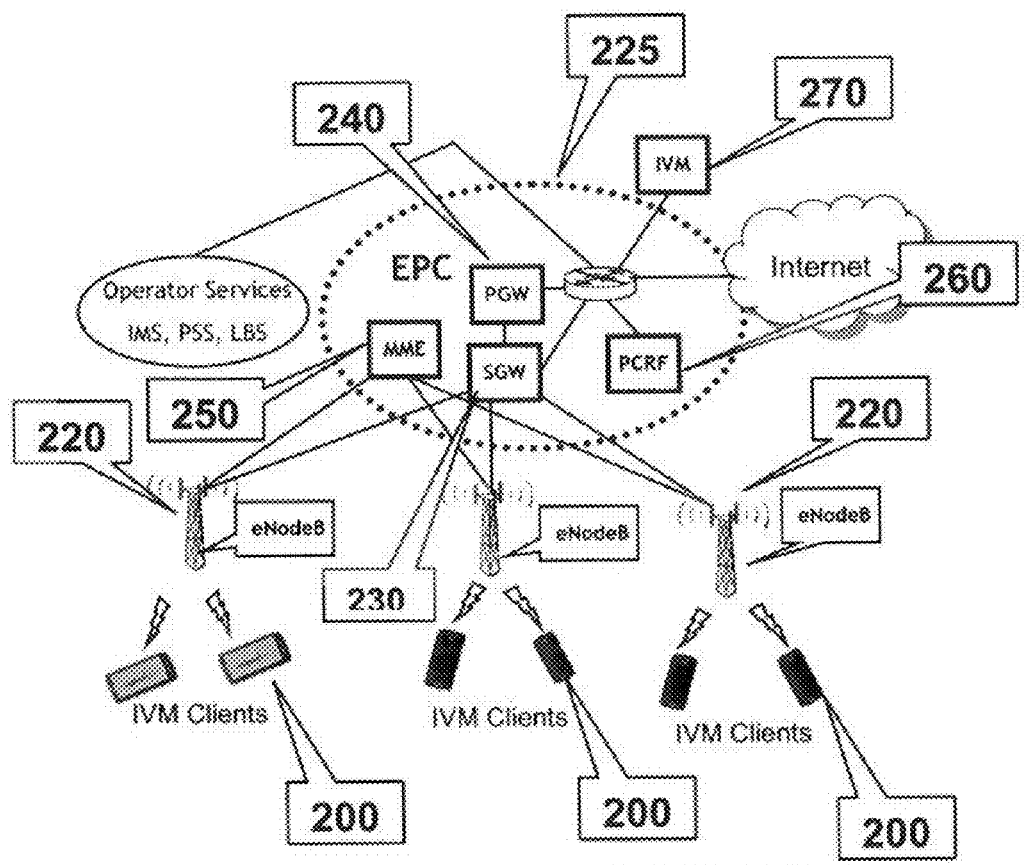
FIG. 3 is a block diagram of an Evolved Packet Core network including an Intelligent Video Masher (IVM) as described below.

Turning now to FIG. 3, one example of wireless networks that can support the above-described methods of video transmission is provided by LTE, a Fourth Generation enhancement to UMTS telecommunication that includes an all-IP networking architecture. LTE is being introduced through a series of releases by the 3rd Generation Partnership Project (3GPP). In LTE, the GPRS core network is replaced by the System Architecture Evolution (SAE), which is a flat, IP-based network architecture. Because LTE is all-IP from end to end, the mobile handsets and other terminal devices 200 for LTE have embedded IP capabilities, and the base stations 220, referred to as Evolved NodeBs (eNodeBs) are IP-based.

FIG. 3 illustrates the Evolved Packet Core (EPC) 225, which is the main architectural component of SAE. It will be seen from the figure that the EPC comprises four elements: the Serving Gateway (SGW) 230, the Packet Data Network Gateway (PGW) 240, the Mobility Management. Entity (MME) 250, and the Policy and Charging Rules Function (PCRF) 260. The SCW, PGW, and MME were introduced in 3GPP Release 8, and the PCRF was introduced in 3GPP Release 7.

The SGW is a data plane element. Its primary function is to manage user-plane mobility and to act as a demarcation point between the radio access network (RAN) and the core networks. The SGW maintains data paths between eNodeBs and the PGW.

The PGW is the termination point of the packet data interface toward the packet data networks. As such, it is the entry and exit, point for traffic for the UEs, i.e., for the user terminals. The PGW supports operator-defined policy for resource allocation and usage, packet filtering, and charging.

The MME performs the signaling and control functions to manage the UE access to network connections, the assignment of network resources, and the management of the mobility states to support tracking; paging, roaming, and handovers, as well as all other control-plane functions related to subscriber and session management.

The PCRF supports service data flow detection, policy enforcement, and flow-based charging. (In LTE, a service data flow—SDF—is the virtual connection that carries data-plane traffic.)

With further reference to FIG. 3, it will be seen that the IVM 270 is situated, for example, just outside the EPC, where it can intercommunicate with the various EPC elements. More particularly, the IVM may be situated just outside the PGW, with which it communicates using known protocols of the Internet protocol suite. Higher protocol layers are used for the signaling and messaging that set up the video streaming. The IVM may reside on any of various hardware platforms, such as an ATCA platform.

Communication between the IVM and the various user terminals, including the MCG terminal and the viewer terminals, is effectuated by a protocol layer added on top of LTE. Such a protocol layer is readily added using known protocols, and need not be described here in detail.

The aforementioned network intelligence acquired by the IVM is gathered from clients running on the various network nodes; including user terminals and elements of the EPC, using known protocols. In particular, information about bandwidth availability may be acquired through negotiation between the IVM and the PCRF. For example, the IVM may request a certain amount of bandwidth from the PCRF, and if the request is denied, the IVM may make second and further, stepped-down requests until a bandwidth grant is made. Likewise, the IVM may acquire information, about the applicable Service Level Agreement (SLA) from the user profile, which is typically stored in an AAA server, which may be accessed via the PCRF.

The invention claimed is:

1. A method for operating a personal communication device, comprising:
   using a user interface, selecting a policy type and entering parameters of the selected policy type, thereby to designate a policy to govern the distribution of a video signal to viewers by a wireless network;
   transmitting one or more messages in which the policy is communicated to a video server within the wireless network and by transmitting said one or more messages, causing the video server to acquire information about bandwidth availability from the wireless network;
   receiving a prompt from the video server to begin transmitting the video signal, wherein the prompt signifies that there is sufficient bandwidth available to comply with the policy; and
   wirelessly transmitting the video signal on an uplink to the wireless network for distribution according to the policy.

2. The method of claim 1, wherein the step of uplink transmission of the video signal comprises streaming the video signal to the video server.

3. A method for operating a personal communication device, comprising:
   using a user interface, selecting a policy type and entering parameters of the selected policy type, thereby to designate a policy to govern the distribution of a video signal to viewers by a wireless network;
   transmitting one or more messages in which the policy is communicated to a video server within the wireless network;
   receiving a prompt from the video server to begin transmitting the video signal; and
   wirelessly transmitting the video signal on an uplink to the wireless network for distribution according to the policy, wherein the policy includes a constraint on at least one of: a quality level for the video signal that is to be distributed, network congestion level, and geographical locations of members of a viewer population.

4. A method to be performed by a video server in a wireless network, comprising:
   receiving, from a user terminal, a request to distribute a video signal subject to a policy;
   accessing a server on which network intelligence is maintained by acquisition of information concerning at least bandwidth availability from the network;
   confirming from the network intelligence that compliance with the policy is feasible;
   sending a prompt to the user terminal to begin transmitting the video signal on condition that said compliance is feasible; and
   receiving the video signal from an uplink to the wireless network.

5. The method of claim 4, further comprising retransmitting the video signal to one or more viewers, wherein the retransmission is carried out subject to the policy.

6. The method of claim 5, wherein the step of retransmitting the video signal comprises streaming the video signal to the one or more viewers.

7. The method of claim 4, wherein the video server occupies a node in the core network of a wireless communication system.

8. The method of claim 7, further comprising caching the video signal, and retransmitting the cached video signal by streaming it to one or more further wireless user terminals.

9. A method to be performed by a video server in a wireless network, comprising:
   receiving, from a user terminal, a request to distribute a video signal subject to a policy;
   accessing a server on which network intelligence is maintained;
   confirming from the network intelligence that compliance with the policy is feasible;
   sending a prompt to the user terminal to begin transmitting the video signal on condition that said compliance is feasible; and
   receiving the video signal from an uplink to the wireless network, wherein:
   the policy includes a constraint on at least one of: a quality level for the video signal that is to be distributed, network congestion level, and geographical locations of members of a viewer population; and
   the network intelligence includes at least one of: device capabilities of viewers, available bandwidth, geographical locations of prospective viewers, personal characteristics of prospective viewers, and size of a prospective viewer population.

10. A server, comprising:
a module configured to obtain network intelligence by acquisition of information concerning at least bandwidth availability from the network and to store said network intelligence;
a module configured: (i) to receive, from a user, a designation of a policy to govern the distribution of a video signal to viewers by a wireless system; (ii) to determine whether the designated policy is feasible by comparing it with the network intelligence; and (iii) to communicate the feasibility determination to the user;
a module configured for receiving streamed video signals from a node of a core network of a wireless communication system; and
a module configured for retransmitting the video signals by streaming them to wireless user terminals.

11. A server, comprising:
a module configured to obtain and store network intelligence;
a module configured: (i) to receive, from a user, a designation of a policy to govern the distribution of a video signal to viewers by a wireless system; (ii) to determine whether the designated policy is feasible by comparing it with the network intelligence; and (iii) to communicate the feasibility determination to the user;
a module configured for receiving streamed video signals from a node of a core network of a wireless communication system; and
a module configured for retransmitting the video signals by streaming them to wireless user terminals,
wherein the policy includes a constraint on at least one of: a quality level for the video signal that is to be distributed, network congestion level, and geographical locations of members of a viewer population.

* * * * *